United States Patent [19]
Ashburn

[11] 3,716,344
[45] Feb. 13, 1973

[54] INTERNAL COMBUSTION ENGINE EXHAUST CATALYTIC REACTOR

[75] Inventor: Dillion P. Ashburn, Ogden, Utah

[73] Assignee: New Products Corporation, Ogden, Utah

[22] Filed: Feb. 10, 1971

[21] Appl. No.: 114,175

[52] U.S. Cl. .....................23/288 F, 60/301, 423/213
[51] Int. Cl. ...............................F01n 3/14, B01j 9/04
[58] Field of Search..................23/288 F, 2 E; 60/301

[56] References Cited

UNITED STATES PATENTS

| | | | |
|---|---|---|---|
| 1,953,120 | 4/1934 | Miller | 23/288 F UX |
| 2,396,190 | 3/1946 | Morgan et al. | 23/288 F UX |
| 3,017,255 | 1/1962 | Norris | 23/2 E X |
| 3,100,140 | 8/1963 | Ashley et al. | 23/288 F |
| 3,109,715 | 11/1963 | Johnson et al. | 23/288 F UX |
| 3,142,150 | 7/1964 | Pearlman | 23/288 F UX |
| 3,172,251 | 3/1965 | Johnson | 23/288 F X |
| 3,201,338 | 8/1965 | Pennington | 23/288 F UX |
| 3,208,131 | 9/1965 | Ruff et al. | 23/288 F UX |
| 3,211,534 | 10/1965 | Ridgway | 23/288 F X |
| 3,441,381 | 4/1969 | Keith et al. | 23/288 F |

FOREIGN PATENTS OR APPLICATIONS

| | | | |
|---|---|---|---|
| 338,933 | 11/1930 | Great Britain | 23/2 E |

Primary Examiner—Barry S. Richman
Attorney—White, Haefliger & Bachand

[57] ABSTRACT

A catalytic reactor to be connected in series with ducting for hot gases containing $CO_2$ comprises:
a. a longitudinally elongated generally tubular case having lengthwise spaced entrance and exit ports, the entrance port to receive said gas at elevated temperature, and
b. multiple metallic fins extending generally longitudinally in the case and in closely packed relation to form multiple flow passages for said gas, the passages being spaced apart transversely of the case,
c. and the fin surface metal consisting of a copper catalyst which when contacted by the hot gas reduces the $CO_2$ content thereby to increase the oxygen content in the gas discharge from said exit port.

11 Claims, 8 Drawing Figures

PATENTED FEB 13 1973 3,716,344
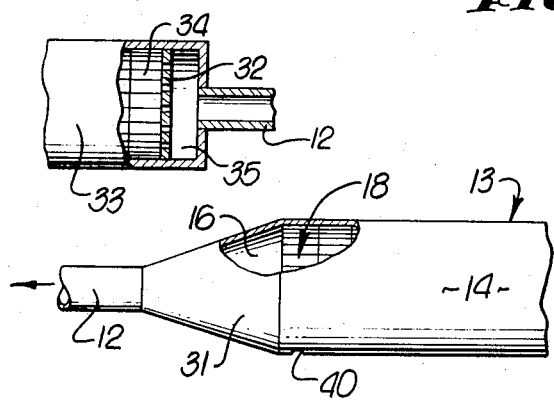
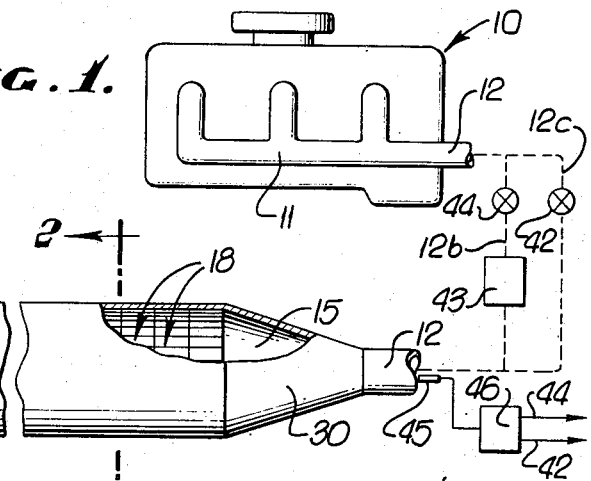
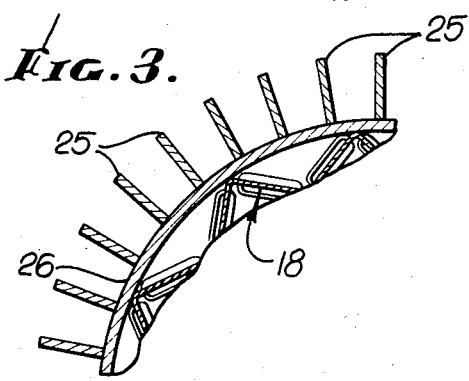
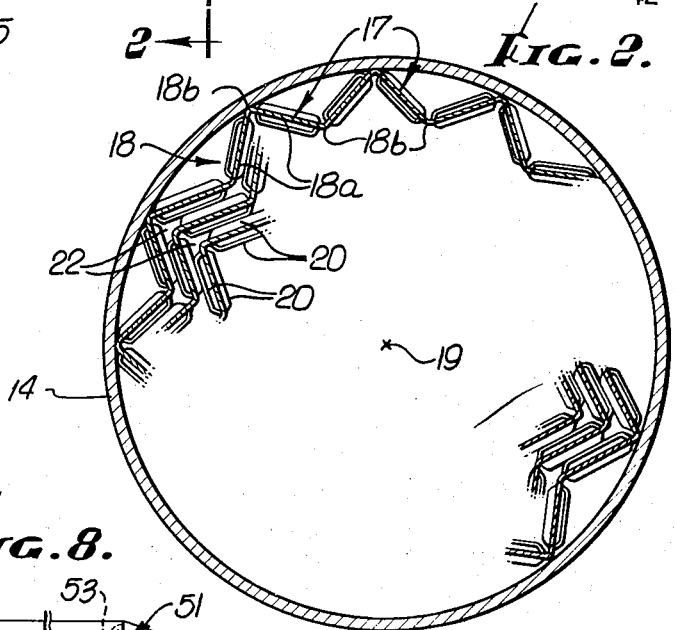
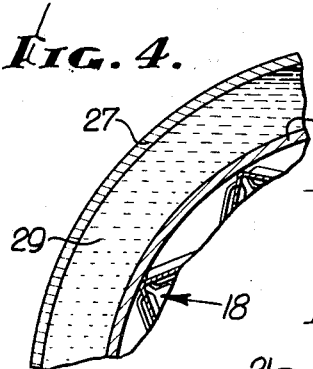
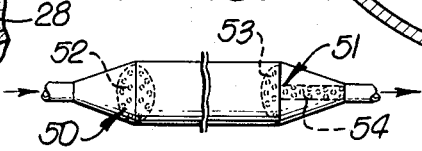
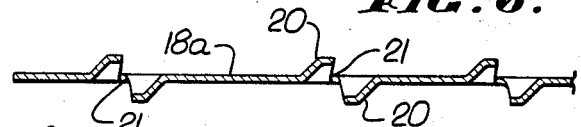
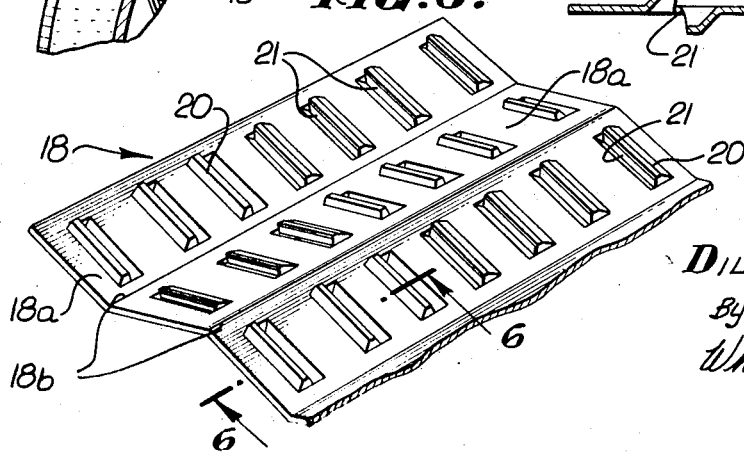
INVENTOR.
DILLION P. ASHBURN
BY
White, Haefliger & Bachand
ATTORNEYS.

INTERNAL COMBUSTION ENGINE EXHAUST CATALYTIC REACTOR

BACKGROUND OF THE INVENTION

This invention relates generally to pollution reduction, and more particularly concerns improvements in internal combustion engine exhaust treatment in catalytic reactors.

In the past, catalytic reactors have suffered from deficiencies such as excessive complexity, the creation of unacceptable back pressure, and failure to remove pollutants to the extent sought or desired in accordance with present day standards. None of such prior reactors have to my knowledge embodied those combinations of unusually advantageous features of construction, mode of operation and desirable results characterized by the present invention.

SUMMARY OF THE INVENTION

It is a major object of the invention to provide a catalytic reactor connectible in series with internal combustion engine exhaust ducting and comprising a longitudinally elongated generally tubular case having lengthwise spaced entrance an exit ports; and multiple metallic fins extending generally longitudinally in the case and in closely packed relation to form multiple flow passages for entering exhaust, the passages being spaced apart transversely of the case; and the fin metal consisting of a catalyst which when contacted by the hot exhaust gases reduces their oxide content so as to increase the oxygen content in the exhaust discharge from the exit port. As will be seen, the fin metal may advantageously consist of copper strip, corrugated and wound in a spiral about an axis extending longitudinally in the case, so that the corrugations and passages extend longitudinally therein. Further, there may be tabs on the strip struck out to project and maintain successive windings spaced apart, and also to form openings through the strip to promote lateral movement of exhaust gases and their intimate contact with the strip metal to promote the reaction. In this way, a pack may be easily formed and introduced into the case to maximize catalytic effectiveness by virtue of great surface area while minimizing back pressure creation.

Additional objects include the corrugations which may be formed to have saw-tooth configuration, with multiple spirally wound strips stacked endwise in the case. The latter may consist of aluminum or aluminum alloy, and there may be cooling means to assure that the exhaust gas temperature is such as to promote desired catalytic action.

These and other objects and advantages of the invention, as well as the details of illustrative embodiment, will be more fully understood from the following description and drawings, in which:

DRAWING DESCRIPTION

FIG. 1 is an elevation showing a reactor connected with an engine exhaust;

FIG. 2 is an enlarged section taken on line 2—2 of FIG. 1;

FIG. 3 is a fragmentary section showing a modification;

FIG. 4 is a fragmentary section showing another modification;

FIG. 5 is a perspective showing of a portion of the catalytic reactor strip;

FIG. 6 is a section taken on line 6—6 of FIG. 5, and

FIGS. 7 and 8 are fragmentary elevations showing still other modifications.

DETAILED DESCRIPTION

In FIG. 1, an internal combustion engine 10, of Otto, Diesel or other cycle, has an exhaust manifold 11 connected with a tail pipe 12. Connected in series with the latter is a catalytic reactor 13 comprising a longitudinally elongated generally tubular case 14 having lengthwise spaced entrance and exit ports 15 and 16.

Contained within the tubular case are multiple metallic fins extending longitudinally in closely packed relation to form multiple flow passages for the engine exhaust, the passages being spaced apart transversely of the case interior. For example, the fins may be defined as corrugations 17 on multiple metallic strips 18 each wound in a spiral about an axis 19 extending longitudinally in the case. The strips are stacked end to end in multiple sections, as shown. Typically, there are tabs 20 on and struck out from each strip to project therefrom and act as spacers for maintaining the spiral windings closely spaced apart. Further, the striking of the tabs from the strip forms openings 21 communicating between the longitudinal passages 22 between such windings, so that hot exhaust gases may not only flow lengthwise in intimate contact with the windings, but may also be deflected by the tabs and through the openings to impinge against the strip winding surfaces. In this way, maximum contacting and scrubbing of the dispersed gases against the thin windings is achieved, for catalytic reaction.

Note that the corrugations may have saw tooth configuration in FIG. 2 cross section as defined by flat portions 18a and folds 18b; further the thickness of the strip may with unusual advantage be between 0.004 and 0.007 inch; the crest to crest dimensions of the saw tooth corrugations may lie between ¼ and ¾ inch; the gap between adjacent windings may be about 1/16 to 3/16 inch; and the crest to trough dimensions of the saw tooth corrugations may lie between ¼ and ½ inch.

The fin or strip metal consists of a catalyst which, when contacted by the hot exhaust gases, reduces the oxide content of the latter thereby to increase the oxygen content in the exhaust discharge from the exit port 16. Typically, the fin metal consists essentially of copper, as for example pure copper which when contacted by the hot exhaust gases produces the following reactions with respect to $CO_2$, $CO$, $NO_2$ and $NO$, and at the indicated temperatures:

$$2\,Cu + CO_2 \quad 2\,CuO + C \quad (1)$$

(at 250° to 550° F)

$$CuO + CO \quad CuO_2 + C \quad (2)$$

(at 175° to 300° F)

$$Cu + N_2O \quad CuO + N_2 \quad (3)$$

(at about 350° F)

$$4\,Cu + 2\,NO_2 \rightarrow 4\,CuO_2 + N_2 \quad (4)$$

(at about 250° F)

$$2\,NO + 2\,CuO \rightarrow 2\,Cu + N_2 + 2\,O_2 \quad (5)$$

(at about 350° F)

$$2\,CO_2 + CuO_2 \rightarrow 2\,O_2 + CuO_2 + 2\,C \quad (6)$$

(at about 500° F)

$$C_nH_{2(n+1)} + (n+1)\,CuO \rightarrow nC + (n+1)\,H_2O + (n+1)\,Cu \quad (7)$$

In the above, it will be noted that $O_2$, $N_2$ and C are produced, and that in reaction (6) the $CuO_2$ content is preserved.

In a test performed upon an internal combustion engine exhaust, the engine running at 1,500 rpm the following exhaust constituent values as measured on a gas chromatograph were observed before and after the exhaust was passed through a reactor constructed in accordance with the invention:

|  | READ | Δ Scale | % | read | Δ | Scale | % |
|---|---|---|---|---|---|---|---|
| composite | 64.3 | — | — | 69.4 | — | — | — |
| $CO_2$ | 52.9 | 52.9 | 10.58 | 12.95 | 10.4 | 10.4 | 2.08 | 2.15 |
| $O_2$ | 62.2 | 9.3 | 1.86 | 2.89 | 78.4 | 68.0 | 13.60 | 17.40 |
| $N_2$ | 66.0 | 66.0 | 66.00 | 80.90 | 62.0 | 62.0 | 62.00 | 79.00 |
| CO | 31.2 | 31.1 | 3.12 | 3.84 | 7.0 | 7.0 | .70 | .891 |
| Total: |  |  | 81.56 | 100.58 | Total: |  | 78.38 | 99.441 |

In the above, note that the $O_2$ content was substantially increased, whereas the CO content was substantially reduced. The $O_2$ percentage content at the discharge of the reactor is just below the normal $O_2$ content for air which is 20.99 percent.

It should also be observed that due to the essentially straight-through construction of the reactor, the back pressure created is very low. Further, it has been found to be similarly workable with both unleaded and leaded gasoline used as fuel for the engine.

Equation (7) above shows the manner in which water is produced from the engine exhaust hydrocarbons; also, water is condensed out of the exhaust gases flowing through the reactor. Such produced and condensed water may be drained from the reactor, as for example via a drainage outlet in the case, shown at 40 in FIG. 1. Another method would be to collect the water in a gravity trap which may be periodically drained.

The temperature of the strip material 18 should preferably be kept under 550° F, and for that purpose cooling of the case 14 may be enhanced as by the means shown for example in FIGS. 3 and 4. In FIG. 3, cooling fins 25 project from the case 26 which, together with the fins, may consist of aluminum or alloys thereof. In FIG. 4 a water jacket 27 surrounds the case 28 to retain cooling water 29 therebetween.

FIG. 1 also illustrates diffuser cones 30 and 31 at the entrance and exit ends of the reactor, to assure desired distribution of the exhaust flow through the many passages formed between the strip windings, and to prevent direct initial impingement of the exhaust gases on the catalyst, since such direct impingement of hot gases tends to erode and ablate the thin catalyst sections. In FIG. 7 a perforated diffuser plate 32 extends across the interior of the shell 33 containing the strip windings or fill 34, at the entrance end 35, to assure desired exhaust flow distribution and to prevent such initial direct impingement of hot exhaust on the thin catalyst fins. Flow diffuser and strainer devices are shown at 50 and 51 in FIG. 8, and consist of holes in baffles 52–54.

An important aspect of the invention concerns the control or maintenance of exhaust gas temperature at a level or levels such as promote desired catalytic action, as described. Such control may be effected by exhaust gas cooling in the line 12, as for example the line 12c which may be unrestricted or may include a valve 42 as shown (which may be open for unrestricted flow). Alternatively, the exhaust may be pre-cooled in a heat exchanger 43 in line 12b, as indicated, and for this purpose valve 44 in that line may be opened to desired degree. The intent is to provide such control (manual or automatic) as will ensure maintenance of the temperature of the exhaust gas entering the reactor 13 within a range such as will promote the desired catalytic action for the copper fin reactor as described. That range is between about 150° and 650° F. Below that range, proper catalytic action will not occur, and above that range, excessive CO will be produced and the life of the catalyst is substantially decreased by chemical action and structural ablation. An exhaust temperature sensor may be provided at 45 at the entrance to the reactor, to provide input for the control and actuator 46 for one or both valves 42 and 44.

It should also be mentioned that particulate matter such as lead compounds, carbon residues and dirt will be trapped in the catalytic bed structure. In this regard, leaded fuel does not contaminate copper.

Further, the reactor may be used, as in a submarine or space station to process air breathed by the crew to convert $CO_2$ to C and $O_2$, with attendant advantages such as extending the underwater cruise time of the submarine, or replenishing the oxygen content of the space station atmosphere. The device may, in fact, be used advantageously anywhere to decrease the CO, $CO_2$, and $NO_X$ content of the atmosphere.

I claim:

1. In a catalytic reactor to be connected in series with an internal combustion engine to receive hot gaseous exhaust, the combination comprising a. a longitudinally elongated generally tubular case having lengthwise spaced entrance and exit ports, the entrance port to receive engine exhaust at elevated temperature, b. multiple metallic fins extending generally longitudinally in the case and in closely packed relation to form multiple flow passages for said exhaust, the passages being spaced apart transversely of the case, c. the exposed fin metal consisting essentially of a copper catalyst which when contacted by the hot exhaust gases reduces the oxide content thereby to increase the oxygen content in the exhaust discharge from said exit port, and d. means to control the temperature of hot exhaust gas entering said case to lie within a range of from about 150° to 650° F.

2. The combination of claim 1 wherein the case consists of a material selected from the group consisting of aluminum and alloys thereof.

3. The combination of claim 1 including a jacket extending about the case for receiving a fluid coolant acting to receive heat transfer from the fins via the case to maintain the fin temperatures below a predetermined level.

4. The combination of claim 1 wherein the fins are defined by a corrugated metallic strip wound in a spiral about an axis extending longitudinally in the case so that the corrugations extend longitudinally therein.

5. The combination of claim 4 wherein there are tabs on the strip and which project to maintain successive strip windings spaced apart, and openings through the strip material.

6. The combination of claim 4 wherein said corrugations have sawtooth cross-sectional configuration, multiple strips being stacked endwise in the case.

7. The combination of claim 4 wherein the corrugations have crest to crest dimensions of about ¼ to ¾ inch.

8. The combination of claim 4 wherein the strip thickness is less than 0.010 inch.

9. The combination of claim 4 wherein the strip thickness is about 0.005 inch, and the strip consists essentially of copper.

10. The combination of claim 4 including a diffuser between said entrance port and said fins to disperse inlet exhaust.

11. In a catalytic reactor connected in series with ducting for hot exhaust gas containing $CO_2$, the combination comprising
 a. a longitudinally elongated generally tubular case having lengthwise spaced entrance and exit ports, the entrance port to receive said gas at elevated temperature,
 b. multiple metallic fins extending generally longitudinally in the case and in closely packed relation to form multiple flow passages for said gas, the passages being spaced apart transversely of the case,
 c. the fin surface metal consisting essentially of a copper catalyst which when contacted by the hot gas reduces the $CO_2$ content thereby to increase the oxygen content in the gas discharge from said exit port, and
 d. means to control the temperature of hot exhaust gas entering the case to lie within a range of from about 150° to 650° F.

* * * * *